(12) United States Patent
Scofield et al.

(10) Patent No.: US 8,621,071 B1
(45) Date of Patent: Dec. 31, 2013

(54) METHOD AND APPARATUS FOR AUTOMATICALLY SELECTING AN ACCESS POINT

(75) Inventors: Daniel Scofield, Meridan, ID (US); Lyman Leonard Hall, Meridan, ID (US)

(73) Assignee: Marvell International Ltd. (BM)

( * ) Notice: Subject to any disclaimer, the term of this patent is extended or adjusted under 35 U.S.C. 154(b) by 65 days.

(21) Appl. No.: 13/164,106

(22) Filed: Jun. 20, 2011

Related U.S. Application Data

(60) Provisional application No. 61/357,859, filed on Jun. 23, 2010, provisional application No. 61/393,662, filed on Oct. 15, 2010.

(51) Int. Cl.
*G06F 15/177* (2006.01)

(52) U.S. Cl.
USPC .................. 709/224; 709/220; 709/221

(58) Field of Classification Search
USPC ............ 709/224; 370/254–465; 713/150–194
See application file for complete search history.

(56) References Cited

U.S. PATENT DOCUMENTS

| | | | |
|---|---|---|---|
| 2004/0059842 A1* | 3/2004 | Hanson et al. .................... 710/8 |
| 2004/0068653 A1* | 4/2004 | Fascenda ...................... 713/168 |
| 2004/0090924 A1* | 5/2004 | Giaimo et al. ................ 370/252 |
| 2006/0067295 A1* | 3/2006 | Lehotsky et al. ............. 370/351 |
| 2006/0153153 A1* | 7/2006 | Bhagwat et al. ............... 370/338 |
| 2007/0019670 A1* | 1/2007 | Falardeau ...................... 370/465 |
| 2007/0223432 A1* | 9/2007 | Badarinath .................... 370/338 |
| 2008/0008140 A1* | 1/2008 | Forssell ......................... 370/338 |
| 2008/0025278 A1* | 1/2008 | Hoecker et al. ............... 370/338 |
| 2008/0056272 A1* | 3/2008 | Batta .......................... 370/395.5 |
| 2008/0077425 A1* | 3/2008 | Johnson et al. ................... 705/1 |
| 2008/0186933 A1* | 8/2008 | Willman et al. .............. 370/338 |
| 2008/0304458 A1* | 12/2008 | Aghvami et al. ............. 370/338 |
| 2009/0067441 A1* | 3/2009 | Ansari et al. ................. 370/401 |
| 2010/0115271 A1* | 5/2010 | Chen et al. ................... 713/160 |
| 2010/0265845 A1* | 10/2010 | Lampen ....................... 370/254 |

OTHER PUBLICATIONS

Wikipedia, The Free Encyclopedia, "Wi-Fi Protected Setup", downloaded from http://en.wikipedia.org/w/index.php?title=WI-FI_Protected_Setup< . . . on Jun. 14, 2011 (3 pgs).

* cited by examiner

*Primary Examiner* — Carl Colin
*Assistant Examiner* — Don Zhao

(57) ABSTRACT

Apparatus, methods, and other embodiments associated with automatically selecting an access point are described. According to one embodiment, an apparatus includes an inquiry logic in a first device. The inquiry logic is configured to automatically determine attributes of a network connection between a network access point and a second device connected to the network access point. The inquiry logic is further configured to determine the attributes of the network connection in response to the first device being connected to the second device. The apparatus also includes a communication logic that is configured to self-configure and automatically establish a wireless connection to the network access point from the first device using the attributes.

18 Claims, 6 Drawing Sheets

METHOD AND APPARATUS FOR AUTOMATICALLY SELECTING AN ACCESS POINT

CROSS REFERENCE TO RELATED APPLICATIONS

This present disclosure claims the benefit of U.S. provisional application No. 61/357,859 filed on Jun. 23, 2010 and U.S. provisional application No. 61/393,662 filed on Oct. 15, 2010, which are hereby wholly incorporated by reference.

BACKGROUND

With advances in wireless networking technology, many devices that have conventionally connected to networks using wired connections have transitioned to using wireless connections. In combination with the increase in wireless devices comes an increase in the number of wireless access points to support these devices. This increased prevalence of wireless networks leads to more networks that share airspace. When a user attempts to manually configure a device to access a wireless network, it can be confusing for the user to select the correct wireless access point from a list of access points that are operating in the same airspace. The selection process is exacerbated when the list of access points includes many neighboring access points that have generic names, which are not readily identifiable.

Other factors can add to the complexity of connecting a wireless device to a network. For example, because wireless networks are vulnerable to security threats, different security protocols may be used to protect different networks. These protocols can have many different implementations. For example, some protocols require the user to coordinate a push-button event on both devices, others use a personal identification number (PIN) from one device that is entered by the user into the other device. Other protocols may require even more involved manual steps to connect to a network. The complexity of these protocols can lead to confusion and difficulties with connecting devices to the network.

SUMMARY

In one embodiment an apparatus includes an inquiry logic in a first device. The inquiry logic is configured to automatically determine attributes of a network connection between a network access point and a second device connected to the network access point. The inquiry logic is configured to determine the attributes of the network connection in response to the first device being connected to the second device. The apparatus also includes a communication logic that is configured to self-configure and automatically establish a wireless connection to the network access point from the first device using the attributes.

In another embodiment, a method includes determining, in a first device, attributes of a network connection between a second device and an access point. The method also includes establishing a wireless connection to the access point from the first device based, at least in part, on the attributes from the second device.

In another embodiment, a non-transitory computer-readable medium includes computer executable instructions that when executed by a processor cause the processor to perform a method. The method includes determining, in a first device, attributes of a network connection between a second device and an access point. The method also includes establishing a wireless connection to the access point from the first device based, at least in part, on the attributes.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example methods, apparatus, and other embodiments associated with automatic selection of a network access point and automatic configuration of a secure connection to a wireless network. In one embodiment, logic is provided for a device that enables the device to be self-configuring for connecting the device to a wireless network. The present system may help to reduce the complexity a user goes through when trying to establish a wireless connection.

In one embodiment, a wireless device is enabled to self-configure a wireless connection to a wireless network by obtaining network information from another device that is already connected to the wireless network. The wireless device may be, for example, a personal digital assistant (PDA), smart phone, peripheral device, a laptop, and so on. The wireless device may self-configure the wireless connection by, for example, automatically selecting the correct access point from a group of access points within range and connecting to the selected access point.

Figure 1:
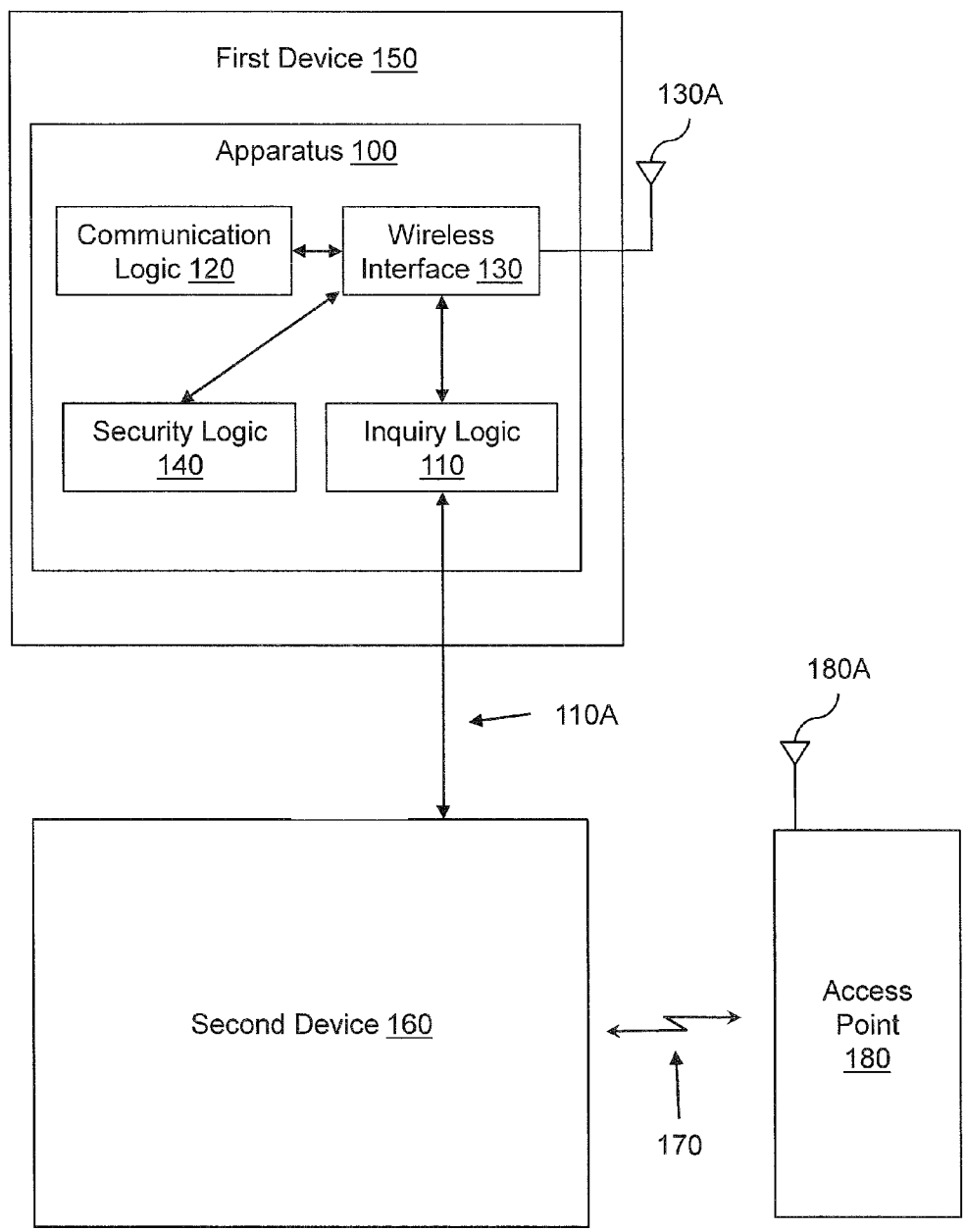
FIG. 1 illustrates one embodiment of an apparatus associated with automatic selection of an access point in a wireless network.

With reference to FIG. 1, one embodiment of an apparatus 100 is shown that is associated with automatically configuring a wireless connection and selecting an access point in a wireless network. The apparatus 100 is a wireless controller and is implemented in a first device 150. In one embodiment, the apparatus 100 is implemented on a chip including one or more integrated circuits configured to perform one or more of the functions described herein or may be implemented in firmware, or both.

In one embodiment, apparatus 100 includes inquiry logic 110, communication logic 120, wireless interface 130, and security logic 140. In one example, the wireless interface 130 is part of the first device 150 and separate from the apparatus 100. The wireless interface 130 is connected to wireless antenna 130A. Wireless antenna 130A is, for example, an external antenna or an internal antenna that is implemented on a chip. Inquiry logic 110 is operably connected to the wireless interface 130. Inquiry logic 110 is also operably connected to a port, which allows communication with a second device 160 (e.g. a computer) after connection through direct connection 110A. The direct connection 110A is, for example, a cable that connects the first device 150 and the second device 160. Communication logic 120 is also operably connected to the wireless interface 130.

Network access point 180 provides network connectivity to one or more devices that are in range and have access rights (such as the second device 160). Network access point 180 includes a wireless antenna 180A that is, for example, an external antenna or an internal antenna for providing wireless communication. Antenna 180A may be connected to a wireless network interface card, in one embodiment within the network access point 180. Additionally, network access point 180 may include connection ports for providing network connectivity to devices through wired connections such as Ethernet connections.

In some embodiments, the access point 180 may be part of a router or other networking hardware. In alternative embodiments the access point is, for example, a wireless network interface card in a personal computer, laptop, and so on that is compatible with Wi-Fi direct. The network connection between the second device and the access point is, for example, an 802.11 compatible wireless connection or a wired network connection.

For purposes of this discussion, suppose the first device 150 is a printer or other peripheral device that is directly connected to a computer (e.g. second device 160) via connection 110A. The printer also includes a wireless interface 130 for wirelessly connecting to another device. Additionally, the computer is connected to the wireless network via wireless connection 170 and access point 180. Further consider that after the printer is connected to the computer via connection 110A, the apparatus 100 (within the printer i.e. first device 150) is configured to automatically determine attributes for the network connection 170. The attributes are then used by communication logic 120 to automatically establish a wireless connection to the network to which the computer is connected.

After the printer 150 is connected to the computer 160, instead of the user manually configuring the printer to connect to the network during installation of the printer, the inquiry logic 110 in apparatus 100 is configured to automatically determine attributes of the network connection 170. Apparatus 100 functions to self-configure the wireless connection in the printer in response to an event. The event may be generated when, for example, a cable is plugged into the printer from the computer to complete connection 110A. In alternative embodiments, the apparatus 100 in the printer may self-configure the wireless connection after a pre-determined period of time from an event, based on a user input, on establishing a Bluetooth connection to the computer, in response to a request from an install process on the printer or on the computer, and so on.

In order to self-configure the wireless connection to the network from the printer, the inquiry logic 110 uses the connection 110A between the printer and the computer to communicate with the computer. Inquiry logic 110 attempts to obtain information from the computer that will be used to establish a wireless connection. Additionally, inquiry logic 110 can cause the computer to perform certain actions by sending communications/requests over the connection 110A. The connection 110A between the printer and the computer may be a USB connection, a serial connection, a parallel connection, a Bluetooth connection, and so on.

In one embodiment, the inquiry logic 110 participates in self-configuring the wireless connection to the access point 180 is by obtaining information from the computer relating to the computer's network interface card(s). In this example, it is presumed that the computer is already connected to the access point 180 through wireless connection 170. Thus, the information about the computer's network interface card(s) is useful when identifying attributes for the access point 180. The information about the network interface card(s) may include, for example, a network address(es) assigned to the computer's network interface card(s).

Once the inquiry logic 110 receives the computer's network address(es), the inquiry logic 110 requests the computer to broadcast packets on the wireless connection 170. The inquiry logic 110 then monitors for the packets broadcast by the computer by sniffing packets using the wireless interface 130 in the printer (i.e. first device 150). The inquiry logic 110 may sniff packets by, for example, passively capturing wireless packets.

Sniffing for packets using the wireless interface 130 will result in capturing all packets that are being transmitted within range of the wireless interface 130. These packets may be from nearby network access points and other wireless devices that are also transmitting wireless communications. While sniffing packets, the inquiry logic 110 compares the network address(es) from the computer to a source address in a sniffed packet. In this way, the inquiry logic 110 is capable of identifying the packets transmitted from the computer (e.g. packets originated from the computer).

When the inquiry logic 110 finds a packet with a matching source address, the inquiry logic 110 retrieves attributes from the packet's header. Because the header information is not encrypted, the inquiry logic 110 may perform the comparison and retrieve attributes about the wireless connection 170. The retrieved attributes include at least an identifier for the access point 180 to which the computer 160 is communicating with. In one example, the identifier of the access point 180 may be a network address such as a Media Access Control (MAC) address assigned to the access point, a Service Set Identifier (SSID) assigned to the access point, a Broadcast Service Set Identifier (BSSID) assigned to the access point, an Internet Protocol (IP) address assigned to the access point, and so on. The attributes may also include a protocol version for the packet, information about encryption used with the packet, and so on. Once the access point 180 is identified from the packet attributes, the access point 180 is selected from other wireless devices in the network.

Communication logic 120 is configured to self-configure the printer (the first device 150) to automatically establish a wireless connection to the now identified network access point 180. The communication logic 120 uses the attributes determined by the inquiry logic 110 to establish the wireless connection. For example, the communication logic 120 generates a packet and uses the identifier (e.g. network address) for the access point 180 to address the packet and uses a protocol version retrieved from the sniffed packet to format the packet in a format recognized and accepted by the access point. The generated packet includes a request for a connection to the access point 180 and is then transmitted wirelessly to the access point 180. In one embodiment, the communication logic 120 initiates the wireless connection process in response to receiving the attributes from one or more sniffed packets.

In this manner the information obtained about the connection between the access point 180 and the computer (the second device 160) allows the printer (the first device 150) to properly select and initiate a connection to the access point for itself.

In another embodiment, the apparatus 100 may provide security functions. For example, security logic 140 is configured to establish a secure connection to the network access point 180 if it is determined that the network access point 180 encrypts wireless network communications. The security logic 140 may establish the secure connection by, for example, using a security code to automatically initiate a Wi-Fi Protected Setup (WPS) handshake between the first device 150 and the network access point 180.

In one embodiment, the security logic 140 obtains the security code by sending a request to initiate a secure communication to the network access point 180. The request includes, for example, a first secret that is part of a key exchange. A secret is data that is used to construct a PIN. It is commonly referred to as a secret because it is unknown to other parties and cannot be constructed with data this is public. For example, the secret may be a number that is used by an algorithm such as Diffie-hellman. The security logic 140 then monitors the network for a reply from the network access point 180. The response includes a second secret that is part of the key exchange. The security logic 140 then uses the first secret and the second secret to construct the security code. The security logic 140 initiates the secure communication by sending the security code in a request to the access point for a secure communication.

Figure 2:
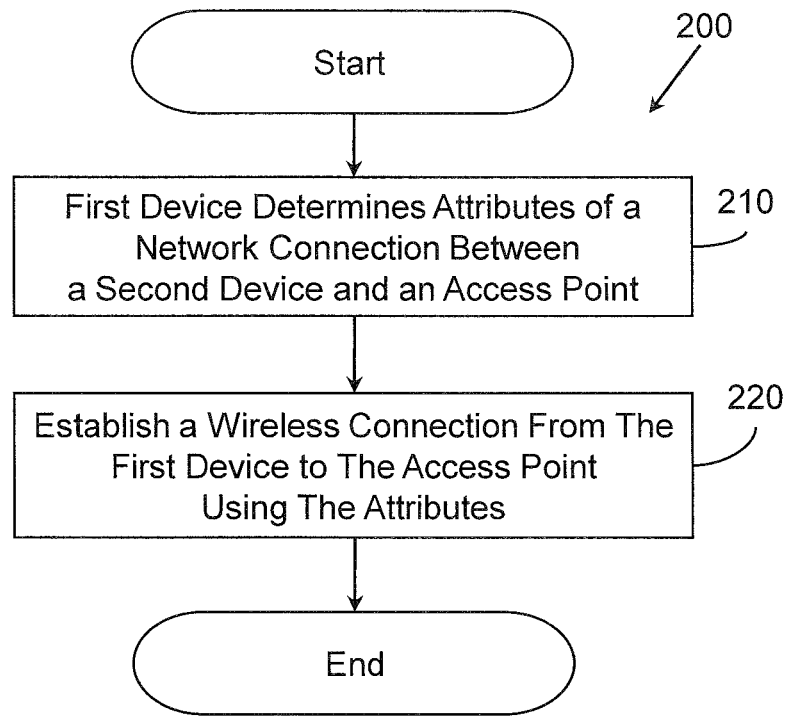
FIG. 2 illustrates one embodiment of a method associated with automatic selection of an access point in a wireless network.

FIG. 2 illustrates one embodiment of a method 200 for automatically selecting an access point in a wireless network and establishing a wireless connection. In one embodiment, the method 200 is implemented in a non-transitory computer-readable medium that stores processor-executable instructions that when executed by a processor cause the processor to perform method 200. Method 200 may also be implemented in an apparatus such as apparatus 100 shown in FIG. 1. Method 200 is described according to the device configuration as shown in FIG. 1 where a first device 160 is connected to a second device 170 and where the second device 170 is wirelessly connected to a network.

At 210, the first device determines attributes of the network connection of the second device. In particular, the first device is attempting to identify an access point which is providing network access for the second device. The first device is, for example, a printer, scanner, fax, mp3 player, laptop, personal computer, camera, tablet computer, e-reader, smart phone, or other peripheral device that can be connected to a computer. The second device is, for example, a laptop, personal computer, server, and so on. The attributes are, for example, a Media Access Control (MAC) address assigned to the access point, a Service Set Identifier (SSID) assigned to the access point, a Broadcast Service Set Identifier (BSSID) assigned to the access point, and/or an Internet Protocol (IP) address assigned to the access point.

In one embodiment, the first device is connected to the second device using a direct connection. The direct connection is a connection directly between the first and second device that is not shared with other devices. As explained previously, the connection may be a physical wired connection or a direct wireless connection.

In one embodiment, the first device determines the attributes of the network connection by causing the second device to provide the attributes. In one embodiment, causing the second device to provide the attributes may occur passively without the second device knowing it is providing the attributes. For example, the first device may passively monitor packets using a wireless interface to identify a packet related to the second device. Upon finding a packet that is related to the second device, the first device scans and retrieves the attributes from the packet to learn about the wireless connection established by the second device including information about the network access point.

At 220, the first device establishes a wireless connection to the access point based, at least in part, on the attributes that where determined at 210. In one embodiment, the first device uses the attributes from the second device to identify and select the correct access point to request and establish a connection. This eliminates errors by users attempting to connect to the wrong access point when there are many access points within wireless range. In this way, the option to connect to any access point within range is removed from the user's hands. When a group of access points exist, method 200 can streamline the connection process by reducing and/or eliminating steps in the configuration of the first device.

In alternative embodiments, the first device establishes the wireless connection based on a security protocol that the access point is configured to enforce. For example, the first device establishes a secure wireless connection by initiating a secure handshake with the access point that was identified using the attributes determined at 210.

In one embodiment, the first device determines a security code for securely connecting to the access point identified by the attributes. The first device may determine the security code, for example, by sending a request to initiate secure communication to the access point and receiving a reply from the access point in response to the request. The request and reply between the two devices exchanges information that results in the security code being shared. In one example, the request from the first device to the access point is a request to begin secure communications between the first device and the access point. The request includes one-half of a secret that is used to determine the security code. The access point will reply to the first device with the second half of the secret that is used to determine the security code. This exchange results in the security code being exchanged between the first device and the access point in a secure manner prior to the secure connection being established.

In one embodiment, the access point performs a security check upon receiving the request to determine whether the first device is permitted to connect to the network. The access point may perform this security check by, for example, sending an identifier assigned to the first device to a security service. The security service uses the identifier to determine whether the first device is permitted to connect to the network. If the first device is permitted to connect, the access point is notified and will send the reply to the first device with the second half of the secret. If the first device is not permitted to connect, the second device will not reply or will reply with a denial message.

In one embodiment, the security code is a Personal Identification Number (PIN). The reply and request used to exchange the PIN may be, for example, part of a Diffie-Hellman key exchange. The PIN is used by the first device to establish the secure wireless connection to the access point. In one embodiment, the first device sends a request to initiate a Wi-Fi Protected Setup (WPS) to the access point with the PIN embedded in the request.

WPS is a standard for easy and secure establishment of a wireless connection. Conventionally, WPS requires user interaction with both devices to initiate a secure connection. However, using the reply and request to exchange the PIN and automatically initiate WPS, the present method provides the ability to connect securely from the first device without having manual interaction with the access point by the user. In this way, a secure connection can be established from a single device using WPS.

Figure 3:
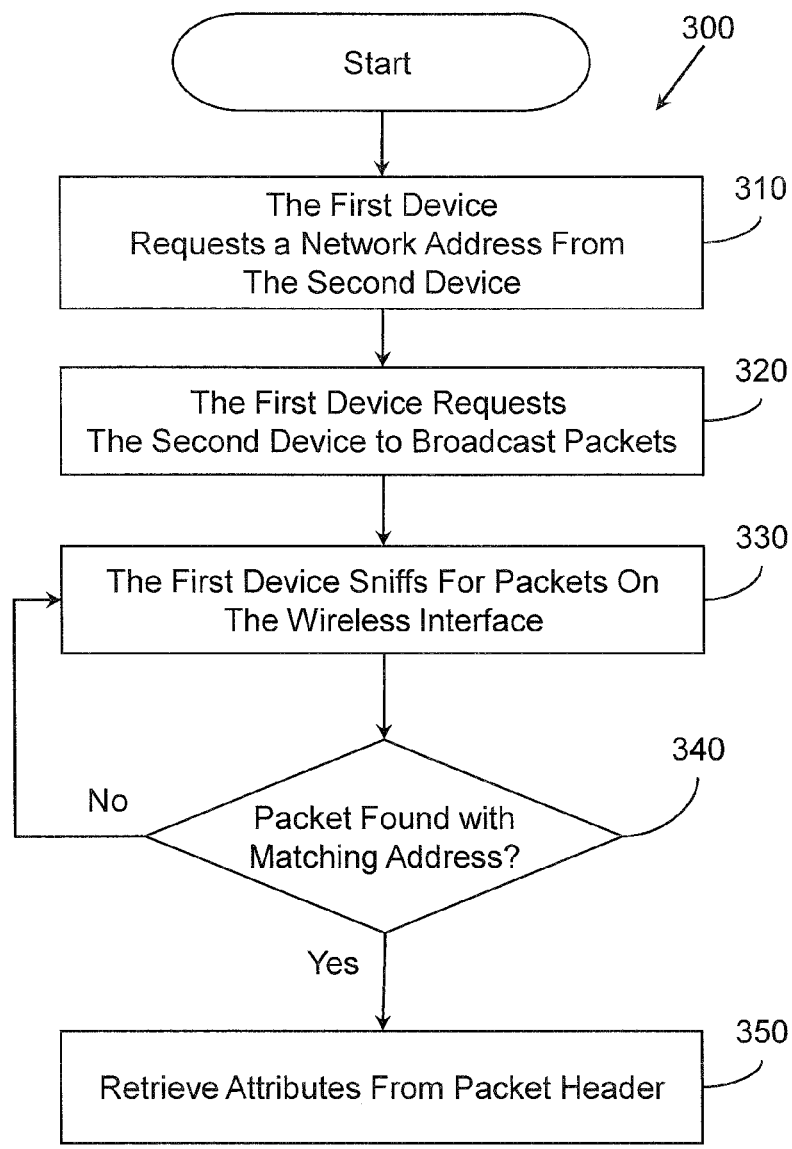
FIG. 3 illustrates one embodiment of a method associated with determining attributes of a network connection for use with automatically selecting an access point in a wireless network.

FIG. 3 illustrates one embodiment of a method 300 associated with determining the attributes of the network connection as discussed with reference to block 210 from FIG. 2. With this method, the first device can automatically configure itself and select an access point in a wireless network by using the network attributes from a different device this is connected to the network (e.g. the second device). For example, the first device can establish a network connection by knowing information about the network connection of the second device. At 310, the first device sends a request to the second device for a network address that is assigned to the second device. In one embodiment, the first device sends the request to the second device over a direct connection to the second device. The direct connection is, for example, a connection between the first device and the second device that is not shared with other devices. One example is a printer (the first device) that is plugged into a computer (the second device). In this way, the direct connection is secure even though data transmitted over the direct connection is not encrypted.

In one embodiment, the second device responds to the request by sending one or more network addresses assigned to the second device to the first device over the direct connection. The second device may, for example, have only one network address or, in other examples, the second device may have multiple network addresses in a case where the second device includes multiple network interface cards.

At 320, the first device requests the second device to transmit packets over the network connection and the first device then wirelessly listens for those packets. Depending on the type of connection between the second device and the network access point (whose identity at this point is unknown to the first device), the manner in which the packets are transmitted may be different. In one embodiment, the second device is wirelessly connected to the access point and thus wirelessly transmits broadcast packets over the network connection to the access point. In another example, the second device is physically wired to the access point and thus transmits the broadcast packets over a wired connection to the access point. In response to receiving the packets, the access point wirelessly relays the packets. In an alternative embodiment, the first device does not request the second device to broadcast packets but instead listens for packets transmitted during normal communications by the second device.

At 330, the first device sniffs for the transmitted packets on a wireless interface in the first device. In one embodiment, the first device sniffs for network packets transmitted from the second device to obtain the attributes to use to establish its own network connection. The first device sniffs for packets, for example, by capturing packets received on the wireless interface in the first device. In this way, all packets transmitted within range of the wireless interface will be captured by the first device. These packets can include, for example, packets from other wireless access points, packets from wireless peripheral devices, packets from wireless personal computers, and so on.

At 340, the first device determines if a packet captured on the wireless interface is from the second device. The first device uses the network address previously obtained from the second device to check whether a source address in a header of the packet matches the second device's network address. If the source address of a packet is the network address of the second device, it means that the packet originated from the second device. In one example, the network address is a Media Access Control (MAC) address assigned to the second device. When a packet with a matching address is found, method 300 proceeds to 350 where attributes of the network connection between the second device and the access point are retrieved from the packet. When the packet does not match, it is discarded and the first device continues sniffing packets at 330.

At 350, the first device retrieves attributes of the network connection from the packet header. In one example, the attributes of the network connection include an identifier for the access point that is a Broadcast Service Set Identifier (BSSID). The BSSID is a network address for the access point. The attributes may also include configuration information for the access point that is used when establishing a connection. In one embodiment, the first device retrieves the attributes by checking one or more fields in the packet header for values that may be associated with the access point and then copying the values to memory. In one embodiment, the header is a MAC header. The method 300 may retrieve attributes from the MAC header since the MAC header is typically unencrypted and therefore the values are easily identifiable. After the attributes from the access point are identified, the method performs block 220 from FIG. 2 where the first device establishes a wireless connection to the access point using the attributes that were obtained based on the connection of the second device.

Figure 4:
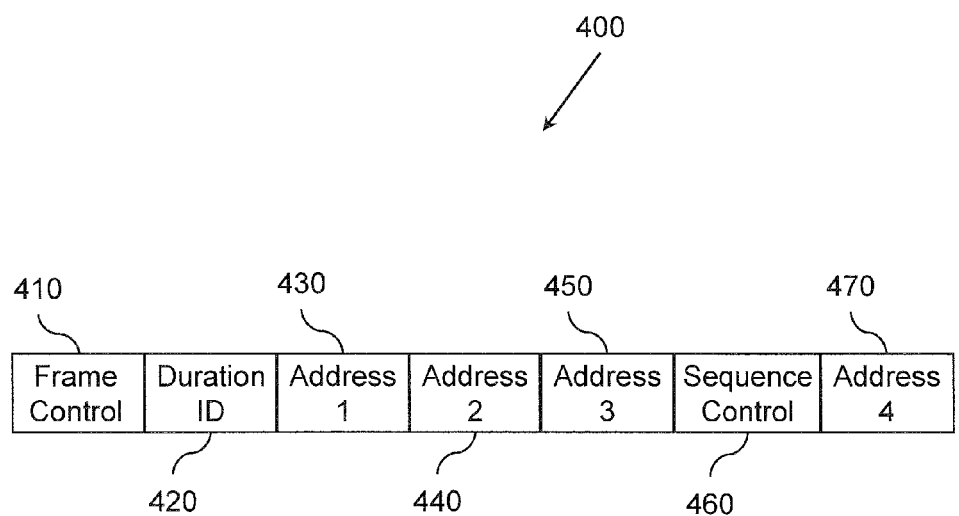
FIG. 4 illustrates an exemplary packet header.

FIG. 4 illustrates an exemplary packet header 400 that shows a general layout/format of a layer 2 MAC packet header. Knowledge of the packet format allows the first device to analyze packets that are captured during packet sniffing. Packet header 400 includes a frame control field 410, a duration ID 420, an address 1 field 430, an address 2 field 440, an address 3 field 450 (source address field), a sequence control field 460, and an address 4 field 470. The first device may receive packets with various header formats while sniffing for packets.

When the first device is sniffing for packets and looking for packets with an address that matches the address of the second device, the first device compares the network address of the second device to the address in the address 3 field 450 of the packet. The address 3 field 450 indicates the original source address of the packet. The address 3 field 450 will include the address for a device that first sent the packet. Devices that relay the packet such as an access point are not considered the "source" of the packet. The address 2 field 440 will include the identifier for the access point. This identifier may be, for example, a BSSID, which is a MAC address of the access point.

The packet header 400 may include attributes about the network connection other than the identifier from the address 2 field 440. For example, the frame control field 410 includes attributes about the network connection such as whether the packet is encrypted, a protocol version for the packet, and so on. These attributes may be used by the first device when establishing a connection to the access point.

In one embodiment, the first device may also determine whether the network connection between the second device and the access point is a wired connection. For example, when the network connection is a wired connection and the access point does not have any current wireless connections, the access point may not wirelessly relay any packets broadcast from devices on the wired connections. In this case, the first device would not capture any wireless packets that originate from the second device because the access point is not wirelessly relaying packets. Therefore, the packets would not be available to the wireless network interface in the first device during the sniffing process.

Thus, in one embodiment, the first device sets a timer to a pre-determined period of time to control the sniffing process. The first device sniffs for packets while the timer is running. If no packets from the second device are detected within the pre-determined period of time, the first device assumes that the second device is physically wired to the access point and thus is not wirelessly communicating. The first device then initiates provisional connections to access points within range of the first device. The first device initiates the provisional connection while the second device is broadcasting packets to induce the access point to wirelessly relay the packets from its wired connections.

In one embodiment, the first device initiates the provisional connection to the access point by, for example, requesting a connection to the access point. This causes the access point to open a wireless connection and waits for the requestor to accept it. The first device intentionally does not respond to the reply from the access point. In this way, the access point leaves the wireless connection open and will wirelessly relay packets broadcast by the second device, which are then captured during the sniff process.

In another embodiment, the first device initiates the provisional connection to the access point by, for example, fully establishing a connection to the access point with a false key. In this instance, the first device establishes a connection that is fully functional but is secured by the access point with a key that the first device does not have. Since the first device used a false key that is not valid to trick the access point into establishing the connection, the first device will not have a valid key for packets sent by the access point. Thus, the first device may not decrypt the network traffic from the access point. However since the access point now has an established wireless connection, the access point will wirelessly relay packets that may then be captured and analyzed by the first device.

In another embodiment, the first device sends a request to the second device for the second device to retrieve attributes of the access point. In this embodiment, the first device sends the request over the direct connection to the second device. The request causes the second device to obtain the attributes from the access point. In one example, the second device obtains the attributes by sending a request to the access point for the attributes. The request is, for example, an Address Resolution Protocol (ARP) Request, a connection request, and so on. In another example, if the attributes of the access point are stored within the second device, then the second device can retrieve the attributes from an internal memory location. Once the second device receives a response from the access point with the attributes or retrieves the attributes from memory, the second device provides the attributes to the first device over the direct connection. After the first device obtains the address and/or other attributes of the access point, the first device can automatically configure a network connection to the access point using the obtained attributes.

Automatically Configuring A Secure Wireless Connection

Figure 5:
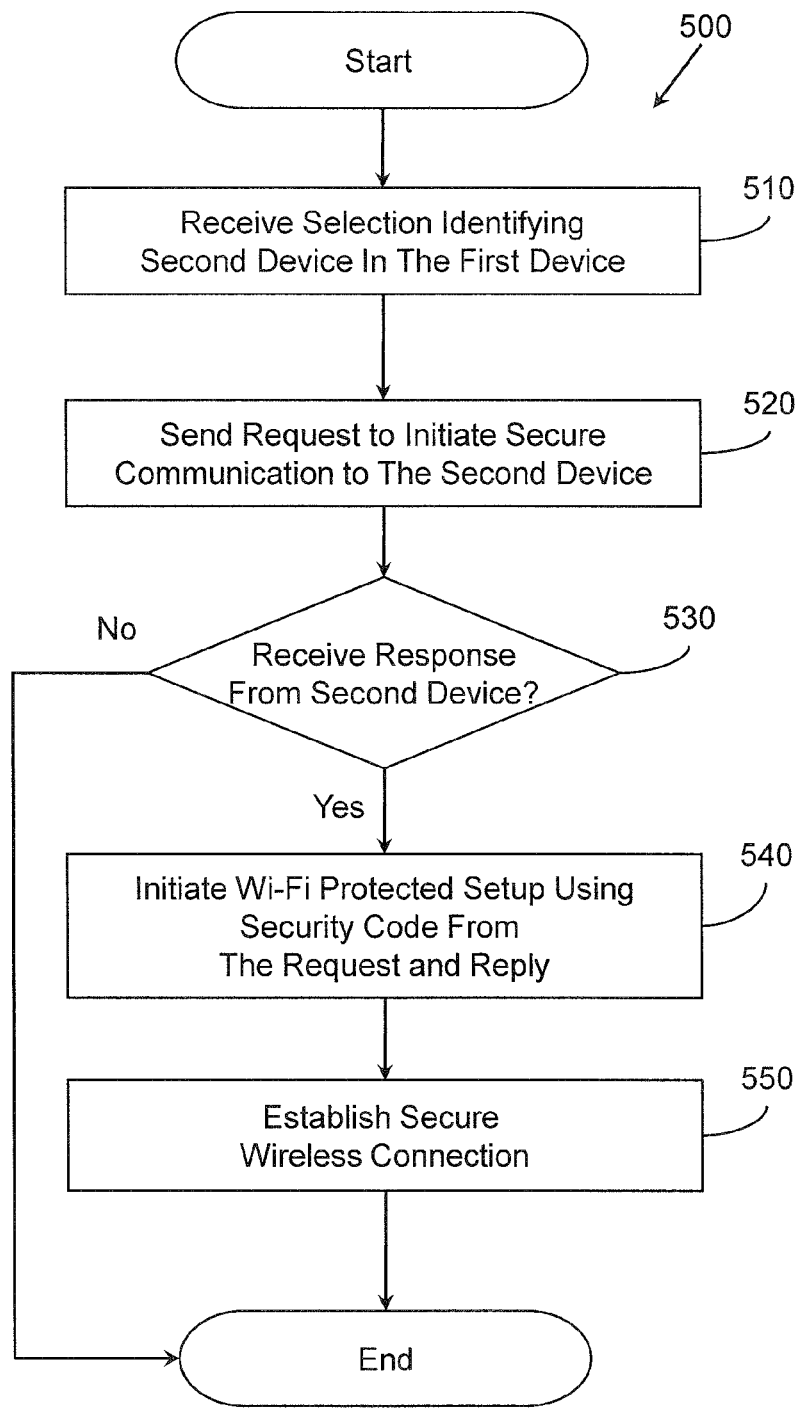
FIG. 5 illustrates one embodiment of a method associated with automatic configuration of a secure wireless connection in a wireless network.

FIG. 5 illustrates one embodiment of a method 500 for automatic configuration of a secure wireless connection in a wireless network. In one embodiment, the method 500 is implemented in a non-transitory computer-readable medium that stores computer-executable instructions that when executed by a processor cause the processor to perform method 500.

Method 500 is discussed as a process between a first device and a second device. In one example the first device is a mobile device, a personal computer, a laptop, a tablet computer, a gaming device, and so on. The second device is a peripheral device, a network access point, a personal computer, a tablet computer, a gaming device, a printer, a scanner, and so on. Both the first device and the second device are capable of wirelessly communicating. Both devices may be compatible with one or more communication protocols, for example, a Wi-Fi direct standard, an 802.11 wireless standard, a Bluetooth standard, and so on.

In one embodiment, method 500 includes the first device determining a security code for wirelessly connecting to the second device. In one example, the first device determines the security code automatically without a user accessing the second device and without the user entering information into the second device. For example, once the second device is selected, the first device performs the subsequent actions without any user interaction with the first device or the second device.

At 510, the first device receives a selection identifying a second device with which to establish a secure communication. In one embodiment, the selection is from a user of the first device that selects the second device from a displayed list. The list is generated, for example, by a Wi-Fi direct discovery routine, an 802.11 scan, and so on. In another embodiment, the selection is automatically provided from a separate process that provides attributes identifying the second device and, for example, properties of the second device. The properties may include, a protocol being used by the second device, and so on.

At 520, the first device sends a request to initiate a secure communication to the second device. The request may be, for example, a probe request, a group owner negotiation message, an invitation message, and so on. The request also includes, for example, a request for a key-exchange. In one embodiment, the key exchange is a Diffie-Hellman key exchange. In other embodiments, the key exchange is compatible with the Extensible Authentication Protocol (EAP). Thus, in one embodiment, the request may be a Wi-Fi direct group owner negotiation request that includes an additional element in an extension field to start the secure communication. The additional element includes, for example, attributes for the first half of a Diffie-Hellman key exchange.

At 530, the first device receives a reply from the second device. The reply is, for example, a Wi-Fi direct group owner negotiation response, a probe response, and so on. In one embodiment, the second device performs a security check upon receiving the request to determine whether the first device is permitted to connect. If the first device is permitted to connect the second device provides the response with the second half of the key exchange and the method proceeds to 540. If the first device is not permitted to connect the method 500 ends without the first device establishing a secure connection. The second device may perform this security check by, for example, sending an identifier assigned to the first device to a security service. The security service uses the identifier to determine whether the first device is permitted to connect to the second device. The second device may also provide a reply that does not include the second half of the key exchange if the first device is not permitted to connect.

Thus, in one embodiment, when the device is permitted to connect, the response is a Wi-Fi direct group owner negotiation response that includes an additional element in an extension field for the key exchange. The additional element includes, for example, attributes for the second half of the Diffie-Hellman key exchange. In one embodiment, once the first device has the first half and the second half of the key exchange, the first device constructs the security code. The security code is, for example, a cryptographic key, a Personal Identification Number (PIN), and so on.

At 540, the first device initiates a Wi-Fi Protected Setup (WPS) using the security code. In one embodiment, the first device sends the security code to the second device in a WPS initiation request.

At 550, the first device and the second device establish a secure connection according to a WPS exchange. In one embodiment, the secure connection is an ad-hoc peer-to-peer network over a wireless connection using Wi-Fi direct. In one embodiment, the secure connection is automatically established from the first device after being initiated by the selection of a second device. Additionally, when automatically establishing the secure connection, a user of the first device has no interaction with the second device. For example, the user of the first device does not enter any information into the second device and/or does not need to coordinate push-buttons on the second device.

Figure 6:
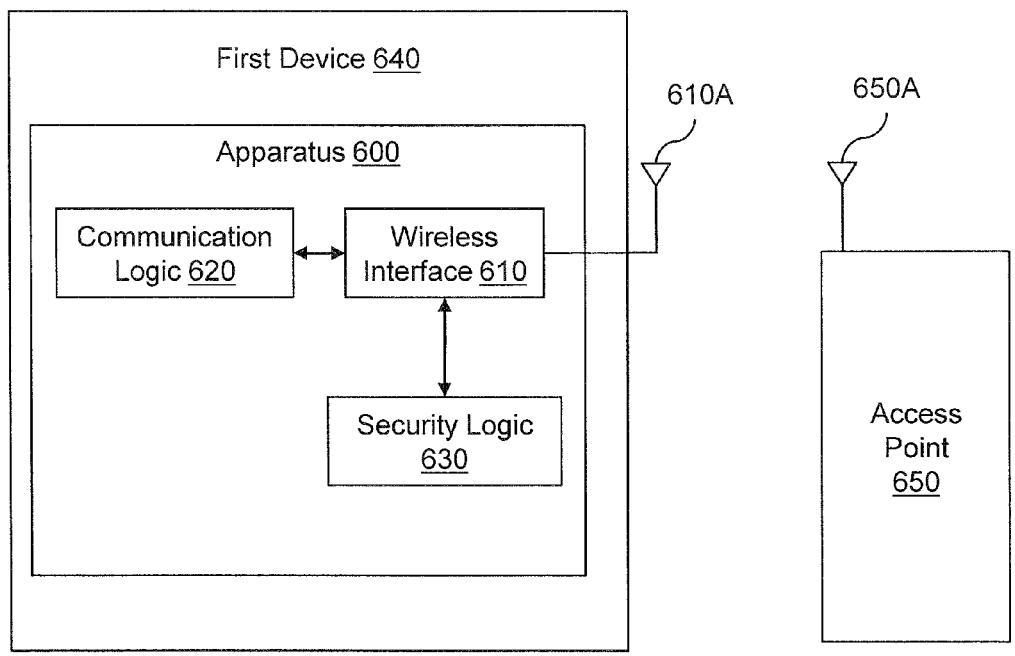
FIG. 6 illustrates one embodiment of an apparatus associated with automatic configuration of a secure wireless connection in a wireless network.

FIG. 6 illustrates one embodiment of an apparatus associated with automatic configuration and establishment of a secure wireless connection in a wireless network. In one embodiment, apparatus 600 is configured to implement method 500. The apparatus 600 may be implemented in a first device 640. The first device 640 is, for example, a peripheral device, a pda, a laptop, a mobile device, a phone, and so on. In one embodiment, Apparatus 600 includes wireless interface 610, communication logic 620, and security logic 630. In one embodiment, the wireless interface 610 is part of the first device but separate from the apparatus 600. Apparatus 600 may be, for example, implemented on a chip including one or more integrated circuits configured to perform one or more of the functions described herein and/or firmware implemented in logic.

Wireless interface 610 is connected to wireless antenna 610A. Wireless antenna 610A is, for example, an external antenna. In other embodiments, wireless antenna 610A is, for example, an internal antenna that is implemented on a chip. Communication logic 620 is operably connected to the wireless interface 610.

In one embodiment, security logic 630 is configured to determine a security code for wirelessly connecting to a second device. Security logic 630 may be configured to, for example, send a request to initiate communication to the second device and receive a reply from the second device in response to the request.

In one embodiment, communication logic 620 is configured to establish a secure wireless connection to the second device from the first device by automatically initiating a Wi-Fi Protected Setup (WPS) based, at least in part, on the security code.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer executable instructions that when executed by a processor cause the processor to perform a method, the method comprising:

determining, in a first device, attributes of a network connection between a second device and an access point, wherein determining the attributes includes the first device requesting a network address from the second device over a direct connection to the second device, wherein determining the attributes includes:

requesting, by the first device, that the second device broadcast packets on the network connection;

sniffing for network packets transmitted from the second device using a wireless network interface in the first device; and obtaining the attributes from the sniffed network packets that have the network address of the second device, and wherein the network address has been assigned to the second device; and establishing a wireless connection to the access point from the first device based, at least in part, on the attributes of the network connection between the second device and the access point, wherein the second device is not a peripheral device.

2. The non-transitory computer-readable medium of claim 1, wherein determining the attributes includes using the wireless network interface in the first device to sniff for network packets transmitted from the second device to obtain the attributes from the sniffed packets.

3. The non-transitory computer-readable medium of claim 2, wherein the first device uses a Media Access Control (MAC) address assigned to the second device to determine if a packet sniffed from the wireless network interface is from the second device.

4. The non-transitory computer-readable medium of claim 3,
wherein determining if a packet is from the second device includes determining whether a source address in a MAC header of the packet matches the MAC address assigned to the second device,
wherein determining the attributes includes retrieving the attributes from the MAC header of the packet, and
wherein the attributes include at least a Broadcast Service Set Identifier (BSSID) for the access point that is retrieved from the MAC header.

5. The non-transitory computer-readable medium of claim 1, wherein establishing the wireless connection includes establishing a secure wireless connection by:
determining, in the first device, a security code for securely connecting to the access point by sending a request to initiate secure communication to the access point and receiving a reply from the access point in response to the request; and
establishing the secure wireless connection to the access point by automatically initiating a Wi-Fi Protected Setup (WPS) using the security code.

6. The non-transitory computer-readable medium of claim 1, further comprising:
requesting, by the first device, that the second device broadcast packets on the network connection;
monitoring for the packets transmitted by the second device on the wireless interface in the first device;
determining whether the network connection between the second device and the access point is a wired connection upon failing to detect a packet transmitted by the second device during a predetermined period of time after the second device has been broadcasting the packets; and
in response to determining the network connection is a wired connection, initiating a provisional connection to the access point without establishing the provisional connection to induce the access point to wirelessly relay the packets broadcasted by the second device.

7. The non-transitory computer-readable medium of claim 1, further comprising:
sending a request from the first device to the second device for the second device to retrieve attributes of the access point,
wherein the request is sent over the direct connection to the second device, and
wherein the request causes the second device to obtain the attributes of the access point from the access point; and
receiving the attributes of the access point from the second device.

8. An apparatus, comprising:
an inquiry logic including at least an integrated circuit, in a first device, and configured to automatically determine attributes of a network connection between a network access point and a second device connected to the network access point in response to the first device being connected to the second device, wherein the inquiry logic is configured to request a network address assigned to the second device over a direct connection between the first device and the second device,
wherein the inquiry logic is configured to cause the second device to broadcast packets on the network connection by sending a request to the second device over a direct connection, and
wherein the inquiry logic is further configured to sniff packets from a wireless interface in the first device and to identify broadcast packets from the second device using the network address assigned to the second device; and
a communication logic to self-configure and automatically establish a wireless connection to the network access point from the first device using the attributes of the network connection between the network access point and the second device, wherein the second device is not a peripheral device.

9. The apparatus of claim 8, wherein the inquiry logic is further configured to automatically determine the attributes by sniffing packets from the wireless network interface in the first device.

10. The apparatus of claim 9,
wherein the inquiry logic is configured to sniff the packets by passively capturing all packets received on the wireless network interface,
wherein the inquiry logic is configured to retrieve the attributes from a header of a packet that includes a source address assigned to the second device, and
wherein the attributes include an identifier for the network access point.

11. The apparatus of claim 8, wherein the direct connection is a Universal Serial Bus (USB) connection to the second device.

12. The apparatus of claim 8, the apparatus further comprises:
a security logic configured to establish a secure connection to the network access point in response to determining the network access point encrypts wireless network communications,
wherein the security logic is configured to establish the secure connection by using a security code to automatically initiate a Wi-Fi Protected Setup (WPS),
wherein the security logic is configured to obtain the security code by sending a request to initiate secure communication to the network access point that includes a first secret and receiving a reply from the network access point in response to the request that includes a second secret.

13. A method, the method comprising:
determining, in a first device, attributes of a network connection between a second device and an access point, wherein determining the attributes includes the first device requesting a network address from a second device over a direct connection to the second device, and wherein the network address has been assigned to the second device, wherein determining the attributes includes:
requesting, by the first device, that the second device broadcast packets on the network connection;
sniffing for network packets transmitted from the second device using a wireless network interface in the first device; and
obtaining the attributes from the sniffed network packets that have the network address of the second device; and
establishing a wireless connection to the access point from the first device based, at least in part, on the attributes of the network connection between the second device and the access point, wherein the second device is not a peripheral device.

14. The method of claim 13, wherein determining the attributes includes using the wireless network interface in the first device to sniff for network packets transmitted from the second device to obtain the attributes from the sniffed packets.

15. The method of claim 14, wherein the first device uses a Media Access Control (MAC) address assigned to the second device to determine if a packet sniffed from the wireless network interface is from the second device.

16. The method of claim 15,
wherein determining if a packet is from the second device includes determining whether a source address in a MAC header of the packet matches the MAC address assigned to the second device,
wherein determining the attributes includes retrieving the attributes from the MAC header of the packet, and
wherein the attributes include at least a Broadcast Service Set Identifier (BSSID) for the access point that is retrieved from the MAC header.

17. The method of claim 13, wherein the direct connection to the second device is a universal serial bus (USB) connection.

18. The method of claim 13, wherein establishing the wireless connection includes establishing a secure wireless connection by:
determining, in the first device, a security code for securely connecting to the access point by sending a request to initiate secure communication to the access point and receiving a reply from the access point in response to the request; and
establishing the secure wireless connection to the access point by automatically initiating a Wi-Fi Protected Setup (WPS) using the security code.

* * * * *